United States Patent [19]
Matsumae et al.

[11] Patent Number: 5,633,577
[45] Date of Patent: May 27, 1997

[54] BATTERY CHARGING SYSTEM FOR ELECTRIC VEHICLES

[75] Inventors: Hiroshi Matsumae, Obu; Yoshihiko Ooyama, Kariya; Keiichiro Banzai, Toyota, all of Japan

[73] Assignee: Nippondenso Co., Ltd., Kariya, Japan

[21] Appl. No.: 467,999

[22] Filed: Jun. 6, 1995

[30] Foreign Application Priority Data

Jun. 6, 1994 [JP] Japan .................................. 6-123958
Jul. 11, 1994 [JP] Japan .................................. 6-158773

[51] Int. Cl.$^6$ .................. H02P 11/04; H02J 9/00
[52] U.S. Cl. .................. 322/37; 322/25; 320/2; 320/32
[58] Field of Search .................. 322/25, 28, 29; 363/37; 307/66; 320/5, 2

[56] References Cited

U.S. PATENT DOCUMENTS

| | | | |
|---|---|---|---|
| 4,038,559 | 7/1977 | Chun et al. | 307/64 |
| 4,719,550 | 1/1988 | Powell et al. | 363/37 |
| 5,198,698 | 3/1993 | Paul et al. | 307/64 |
| 5,198,970 | 3/1993 | Kawabata et al. | 363/37 |
| 5,216,402 | 6/1993 | Carosa. | |
| 5,302,858 | 4/1994 | Folts | 307/66 |
| 5,416,401 | 5/1995 | Neuhaus | 320/15 |
| 5,457,377 | 10/1995 | Jonsson | 320/5 |

FOREIGN PATENT DOCUMENTS

| | | |
|---|---|---|
| 63-33337 | 3/1988 | Japan . |
| 6133564 | 5/1994 | Japan . |

*Primary Examiner*—Steven L. Stephan
*Assistant Examiner*—Nicholas Ponomarenko
*Attorney, Agent, or Firm*—Cushman, Darby & Cushman IP Group of Pillsbury Madison & Sutro LLP

[57] ABSTRACT

A battery charger includes a primary side circuit, a transformer, a secondary side circuit and a control circuit. The secondary side circuit includes a first output unit and a second output unit. The battery charges a main battery and an auxiliary battery. The first output unit, which is connected to a main battery, includes an integrated rectifier-converter and a smoothing circuit. The integrated rectifier-converter is formed using MOSFETs. When charging the auxiliary battery with power from the main battery, power from the main battery is converted by the integrated rectifier-converter to AC power which induces power in an output winding of a transformer connected to the auxiliary battery.

23 Claims, 10 Drawing Sheets

BATTERY CHARGING SYSTEM FOR ELECTRIC VEHICLES

CROSS REFERENCE TO RELATED APPLICATIONS

This application is based on and claims priorities of Japanese Patent Applications No. 6-123958 filed on Jun. 6, 1994 and No. 6-158773 filed on Jul. 11, 1994, the contents of which are incorporated herein by reference.

BACKGROUND OF THE INVENTION

1. Field of the Invention

The present invention generally relates to a battery charging system for electric vehicles, and more particularly to an integration of main battery charger components and auxiliary battery charger components for common use.

2. Description of the Related Art

As prior art, the Japanese Unexamined Utility Model Publication No. 63-33337 discloses a technique in which a charger is dedicated to a main battery for driving a vehicle and to an auxiliary battery for driving auxiliary type loads are. This technique aims to reduce the size, weight and cost of the chargers by using a common DC/AC converter and transformer but at the cost of providing a change-over switch selectively switching the main battery charger and the auxiliary charger on the main battery side.

However, in the battery charging system disclosed in the above publication, two sets of large-capacity change-over switches to meet the large current flowing into the main battery are required on the main battery side, and this poses a problem in that the frame of the battery charging system must then be enlarged to accommodate the two sets of large-capacity change-over switches.

SUMMARY OF THE INVENTION

It is an object of the present invention to provide a small-sized battery charging system which requires no large-capacity change-over switches.

According to the present invention, when electric power is supplied from a commercial AC power source, this electric power is rectified by a rectification circuit, and a rectified output is converted to high-frequency alternating current by a DC/AC converter. This high-frequency alternating current is stepped up/down by the transformer, and output voltage is induced.

The output voltage from a part of this output winding is rectified by a device of a first output part and supplied to a main battery, and thereby the main battery is charged with this rectified output voltage.

On the other hand, the output voltage from the other parts of the output winding is rectified by the second output part and supplied to the auxiliary battery, and the auxiliary battery is charged with this second rectified output voltage.

When the auxiliary battery is charged with an input of electric power from the main battery, the electric power from the main battery is converted to high-frequency alternating current by the device of the first output part and is output to the transformer, and stepped up/down by the transformer. Upon receiving the output from the transformer, the second output part starts to charge the auxiliary battery.

That is, when electric power is supplied from the commercial AC power source, the main battery is charged by flowing current in one direction of the device of the first output part through which current flows bidirectionally and concurrently the auxiliary battery is charged through the second output part, and when the auxiliary battery is charged with an input of electric power from the main battery, the auxiliary battery is charged by the second output part by flowing current of the device of the first output part in the other direction.

Accordingly, the electric power from the commercial AC power source can be charged into the main battery and the auxiliary battery and the electric power from the main battery can be charged into the auxiliary battery without requiring any large-capacity change-over switch to meet large current flowing into the main battery.

A , a primary coil and a secondary coil are separably provided in the inductive coupler. Therefore, when the primary coil is in the coupled state, the main battery and the auxiliary battery can be charged. When the primary coil is in the uncoupled state, the auxiliary battery can be charged with an input of electric power from the main battery.

The device of the first output part is comprised of MOSFETs. Therefore, when the auxiliary battery is charged with an input of electric power from the main battery, the MOSFET's are switched and the electric power is converted to high-frequency alternating current on one hand, and the output voltage from the transformer can be rectified by using the parasitic diode of the MOSFET on the other hand. As a result, the device of the first output part can be comprised of a single part and the size of the battery charging system can be reduced.

The element of the first output part is configured with a parallel connection to the rectification device and switching device. Therefore, when the auxiliary battery is charged with an input of electric power from the main battery, the electric power can be converted to high-frequency alternating current by switching the switching device, and when electric power is supplied from the commercial AC power source, the electric power is rectified by the rectification device and the main battery can be charged with the rectified voltage from the rectification device. Even if the device of the first output part is configured with a parallel connection to the rectification device and switching device, the electric power from the commercial alternating current can be charged into the main battery and the auxiliary battery, and the electric power from the main battery can be charged into the auxiliary battery without requiring any large-capacity change-over switch to meet large current flowing into the main battery.

The switching device of the first output part is switched in synchronization with the switching of the DC/AC converter and thereby a part of the output voltage from the output winding of the transformer is rectified also by the rectification device. Accordingly, electrical loss caused at the rectification part due to output voltage from the output winding during rectification at the rectification part in the first output part can be reduced and thereby rectification efficiency can be improved.

First switching means provided in parallel with a smoothing coil short-circuits the smoothing coil when the auxiliary battery is charged with an input of electric power from the main battery. Accordingly, over-voltage due to counter-electromotive force of the smoothing coil can be prevented and electric power loss due to the smoothing coil can be eliminated.

The ratio of the number of windings T2 of the first output part of the transformer or inductive coupler to the number of windings T3 of the second output part thereof is set to be T2:T3≈m:2 wherein the number of batteries composing the auxiliary battery is 1 and the number of batteries composing the main battery is m.

A spring is provided to position first, second and third magnetic core parts to the opened position or closed position and maintain the coupled state and, thus, the primary coil and the secondary coil can be coupled with each other more exactly.

Preferably, a magnetic body is inserted into the recessed part of the secondary coil when the primary coil and the secondary coil are separated from each other, gaps between the first, second and third core members can be eliminated, loss at the recessed parts can be eliminated, and the transformer with high coupling ability can be formed.

DETAILED DESCRIPTION OF THE PREFERRED EMBODIMENTS

With reference to the appended drawings, preferred embodiments of the present invention will now be described.

[First Embodiment]

Figure 1:
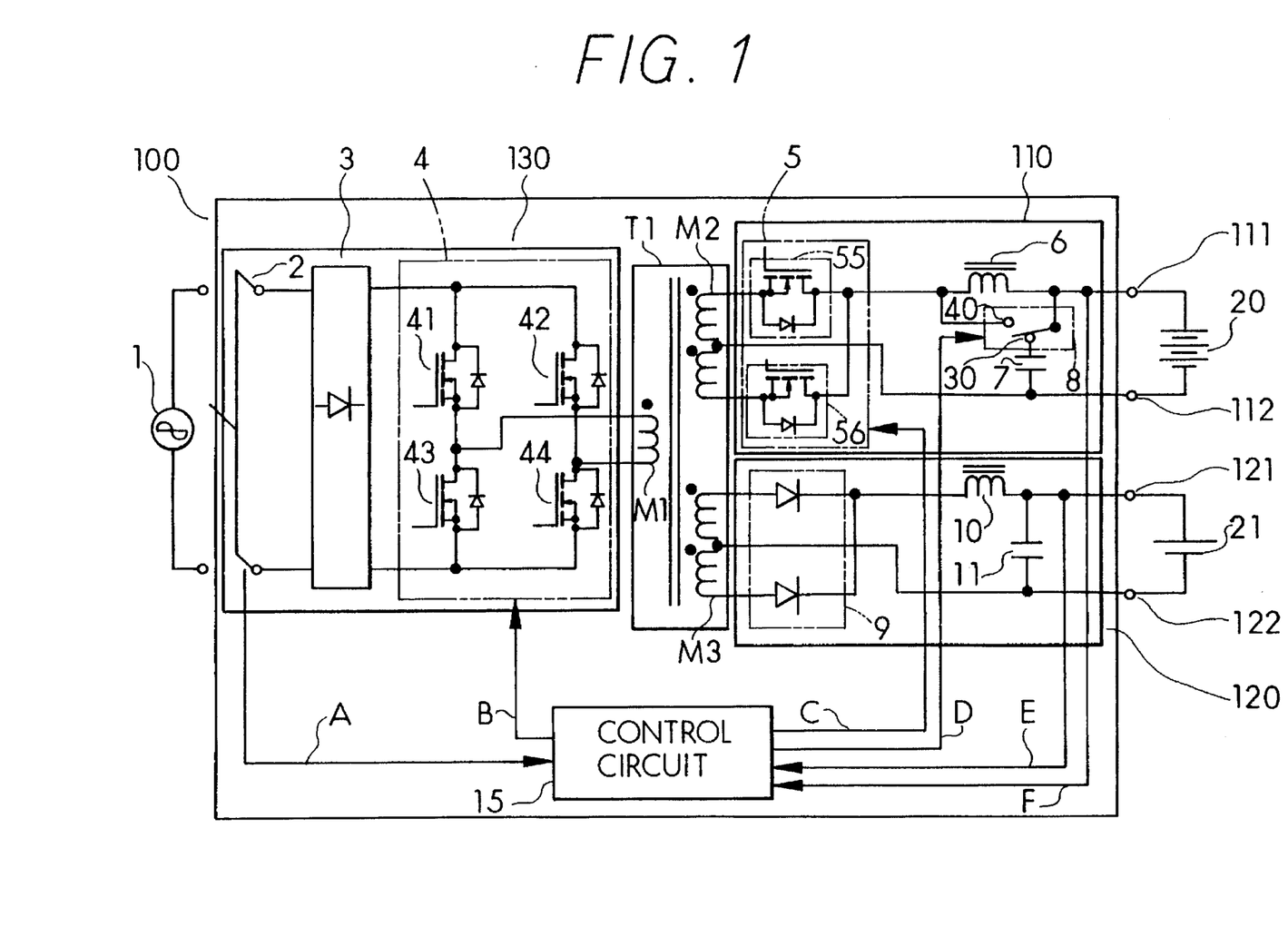
FIG. 1 is an electric wiring diagram illustrating a first embodiment according to the present invention.

As illustrated in FIG. 1, a battery charger 100 for an electric vehicle is connected to a commercial AC power source 1 and charges a main battery 20 and an auxiliary battery 21 for driving an electric vehicle. Even when the electric vehicle is in running, the battery charger 100 charges the auxiliary battery 21 with an input of voltage from the main battery 21.

The charger 100 illustrated in FIG. 1 is comprised of a primary side circuit 130, a transformer T1, a first output part 110 on the secondary side, a second output part 120 on the secondary side, and a control circuit 15.

The primary side circuit 130 is comprised of a connector 2 for connecting the commercial AC power source 1 and the battery charger 100, a rectifying device 3 for full-wave rectifying AC power input from the commercial AC power source 1, and a switching circuit 4 for flowing full-wave rectified current to a primary winding M1 of the transformer T1 by switching ON/OFF for closing/opening. The switching circuit 4 may be comprised of semiconductor devices such as transistors, IGBTs and MOSFETs, but should preferably be composed of MOSFETs.

The transformer T1 induces voltage on secondary windings M2 and M3 by receiving DC voltage high-frequency switched by the primary side circuit 130.

The first output part 110 on the secondary side is comprised of a an integrated rectifier-converter circuit 5 having a function of rectifying current generated by the voltage induced on the secondary winding M2 of the transformer T1 and also the functions of switching the supply of power to the main battery 20, a reactor 6 for smoothing an output voltage, a capacitor 7, and a change-over switch 8 changed over according to signals from the control circuit 15 when the auxiliary battery 21 is charged with an input of voltage from the main battery 20. Output terminals 111 and 112 are connected to the main battery 20.

The second output part 120 is comprised of a rectification circuit 9 rectifying current generated by the voltage induced on the secondary winding M3 of the transformer T1, a reactor 10 for smoothing output, and a capacitor 11. Output terminals 121 and 122 thereof are connected to the auxiliary battery 21.

The control circuit 15 is connected to the connector 2, the switching circuit 4, the integrated rectifier converts circuit 5, the change-over switch 8, and the output terminals 111 and 121 by signal lines A, B, C, D, E and F respectively, and controls the switching circuit 4, the integrated rectifier converts circuit 5 and the change-over switch 8 according to signals from the signal lines A, E and F respectively.

Next, referring to FIG. 4, the operation of the battery charging system so constructed as described above will be described.

[When Charged from Commercial AC Power Source]

Figure 4:
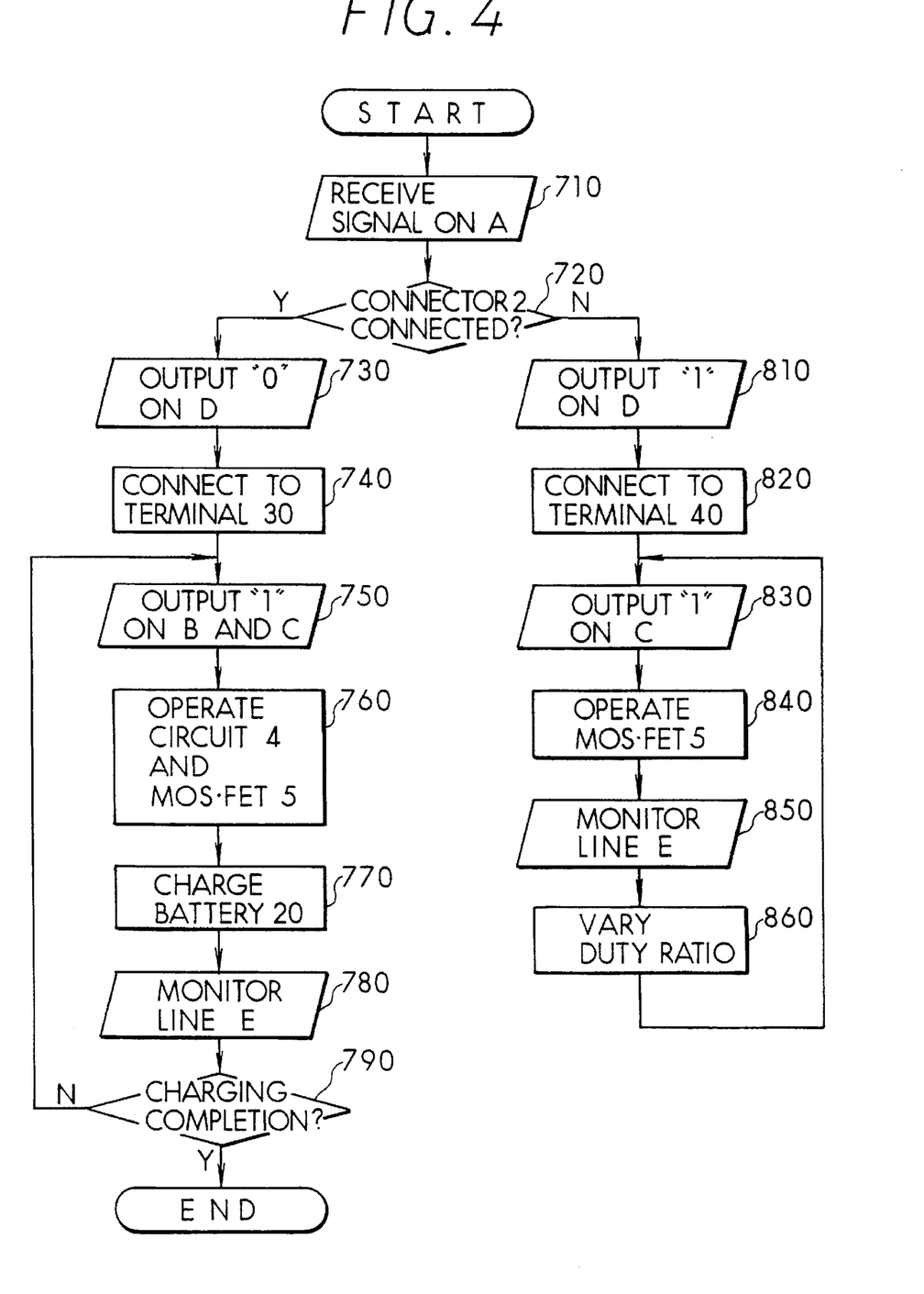
FIG. 4 is a process flow chart illustrating the operation of the battery charging system according to the first embodiment of the present invention.

In a process flow chart illustrated in FIG. 4, the control circuit 15 receives a signal from the signal line A in step 710, and then determines that the connector 2 is connected to the commercial AC power source 1 in step 720, and the process proceeds to step 730. Now, charging of the main battery 20 and auxiliary battery 21 from the commercial AC power source 1 will be described.

After detecting through the signal line A that the connector 2 of the battery charger 100 is connected to the commercial AC power source 1, the control circuit 15 outputs the level "0" through signal line D in the step 730, and connects the change-over switch 8 to the side of a terminal 30 to connect the capacitor in parallel with the main battery 20 in step 740.

On the other hand, alternating current supplied from the commercial AC power source 1 is full-wave rectified into direct current by the rectification circuit 3. Then, the control circuit 15 outputs the level "1" through the signal lines B and C in a step 750, the switching circuit 4 switches by the full-wave bridging method according to a signal from the control circuit 15, flows the current rectified by the rectification circuit 3 to the primary winding M1 of the transformer T1, and induces the secondary winding M2 of the transformer T1 in a step 760. At this time, MOSFETs 55 and 56 are switched ON/OFF in synchronization with the switching circuit 4. The current on the secondary side generated by the induced voltage is full-wave rectified by a parallel circuit with the MOSFET's 55 and 56 of the integrated rectifier-converter circuit 5 and a parasitic diode, smoothed by the reactor 6 and the capacitor 7, and charged into the main battery 20 in a step 770.

On the other hand, the secondary winding M3 of the transformer T1 is also induced by the switching of the switching circuit 4, and the current generated by the induced voltage is full-wave rectified by rectification diodes 9 of the second output part 120, smoothed by the reactor 10 and the capacitor 11, and charged into the auxiliary battery 21.

In step 780, the control circuit 15 monitors charging voltage from the main battery 20 through the signal line E and varying the duty ratio of the switching of the switching circuit 4 to maintain the charging voltage to a constant level. In step 790, when the voltage from the main battery 20 reaches a preset voltage, the control circuit 15 determines that the charging has been completed and terminates the charging operation.

[When Commercial AC Power Source Is Separated]

When charging of the electric vehicle is completed and the charger 100 is disconnected from the connector 2, the control circuit 15 outputs the level "1" through the signal line D in step 810, and connects the change-over switch 8 to the side of a terminal 40 to short-circuit the reactor 6 and also sets the capacitor 7 to the open-circuit state in a step 820.

The electric power supplied from the main battery 20 in this state drives the integrated rectifier-converter circuit 5 to perform a switching operation by a push-pull method by outputting the level "1" through the signal line C, and thereby the secondary winding M2 of the transformer T1 becomes a primary winding M2' and induces the secondary winding M3 of the transformer T1.

The current generated by the induced voltage is full-wave rectified by the rectification diode 9, smoothed by the reactor 10 and the capacitor 11, and charged into the auxiliary battery 21.

The control circuit 15 monitors the charging voltage into the auxiliary battery 21 through the signal line E in step 850, and maintains the charging voltage to a constant level by varying the duty ratio of the switching of the switching circuit 4 in step 860.

Accordingly, in both cases where the main battery 20 and the auxiliary battery 21 are connected to the commercial AC power source 1 and charged thereby and where the auxiliary battery 21 is charged with the input of voltage from the main battery 20 with the commercial AC power source 1 not connected thereto, there is no need to provide such a large-capacity change-over switch. Therefore, this change-over can be dispensed with and thereby a small-size, light-weight and low-cost battery charger for an electric vehicle can be provided.

Alternatively to above embodiment, however, the it may be so arranged that the reactor, the capacitor 7 and the terminal 8 are dispensed with and the terminal 111 is directly connected to the integrated rectifier-converter circuit 5.

[Second Embodiment]

Figure 2:
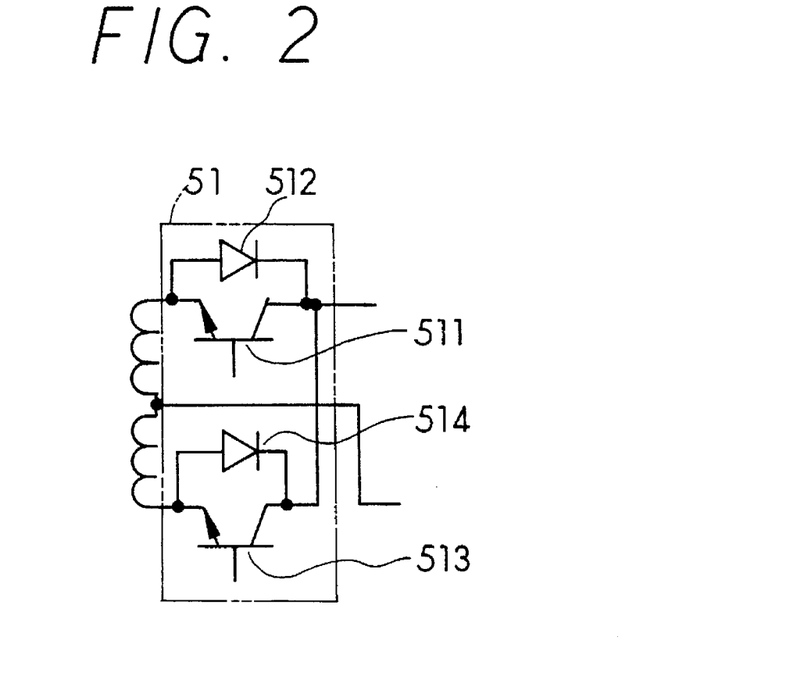
FIG. 2 is a view illustrating a part of a second embodiment according to the present invention.

The integrated rectifier-converter circuit 5 is comprised of MOSFETs in the above first embodiment. As illustrated in FIG. 2, however, the same effect as that of the first embodiment can be obtained by combining transistors 511 and 513 and rectification diodes 512 and 514 or IGBTs and rectification diodes.

[Third Embodiment]

Figure 3:
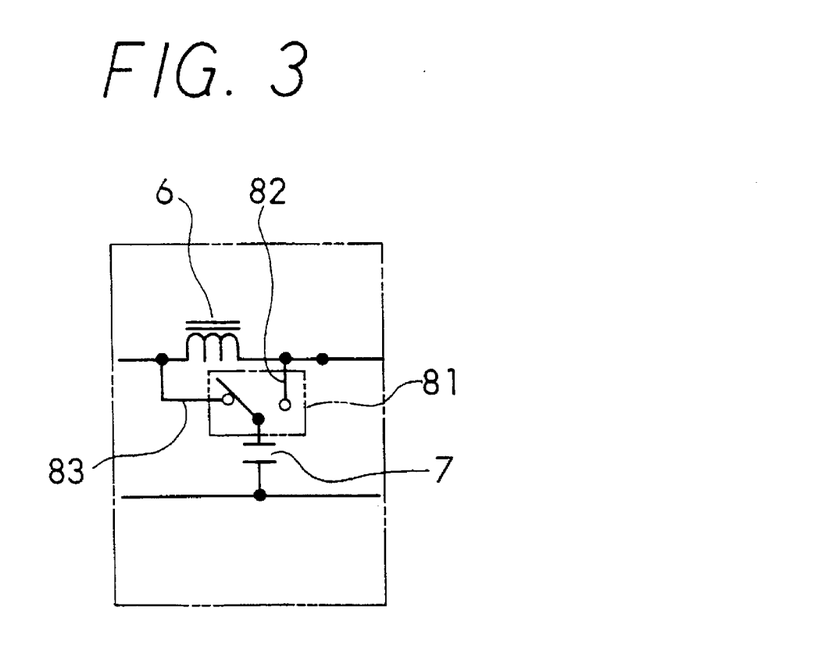
FIG. 3 is a view illustrating a part of a third embodiment according to the present invention.

Against the above first embodiment, the third embodiment is illustrated in FIG. 3 which is provided with a modification of the change-over switch 8 of the first output part.

As illustrated in FIG. 3, a change-over switch 81, which is different from the counterpart of the first embodiment, is provided for a smoothing circuit comprised of the reactor 6 and the capacitor 7.

This change-over switch 81 includes a terminal 83 for connecting the left side (FIG. 3) of the reactor 6 and the capacitor 7 and a terminal 82 for connecting the right side (FIG. 6) of the reactor 6 and the capacitor 7.

The operation of the change-over switch 81 will be described.

When the connector 2 is connected to the commercial AC power source 1 and the main battery 20 and the auxiliary battery 21 are charged, the change-over switch 81 makes a connection with the terminal 82 and operates as a smoothing circuit in the same way as in the first embodiment.

On the other hand, when the connector 2 is not connected to the commercial AC power source 1 and the auxiliary battery 21 is charged with the input of voltage from the main battery 20, the change-over switch 81 makes a connection with terminal 83.

Voltage from the main battery 20 charges the capacitor 7. The voltage accumulated in the capacitor 7 is switched by the push-pull type integrated rectifier-converter circuit 5 driven by the control circuit 15, the secondary winding M2 of the transformer T1 becomes the primary winding M2', the secondary winding M3 of the transformer T1 is induced, and the auxiliary battery 21 is charged in the same way as in the first embodiment.

[Fourth Embodiment]

The fourth embodiment according to the present invention will be described referring to FIG. 5.

In the first place, the constructional differences of this embodiment from the first embodiment illustrated in FIG. 1 will be pointed out.

Figure 5:
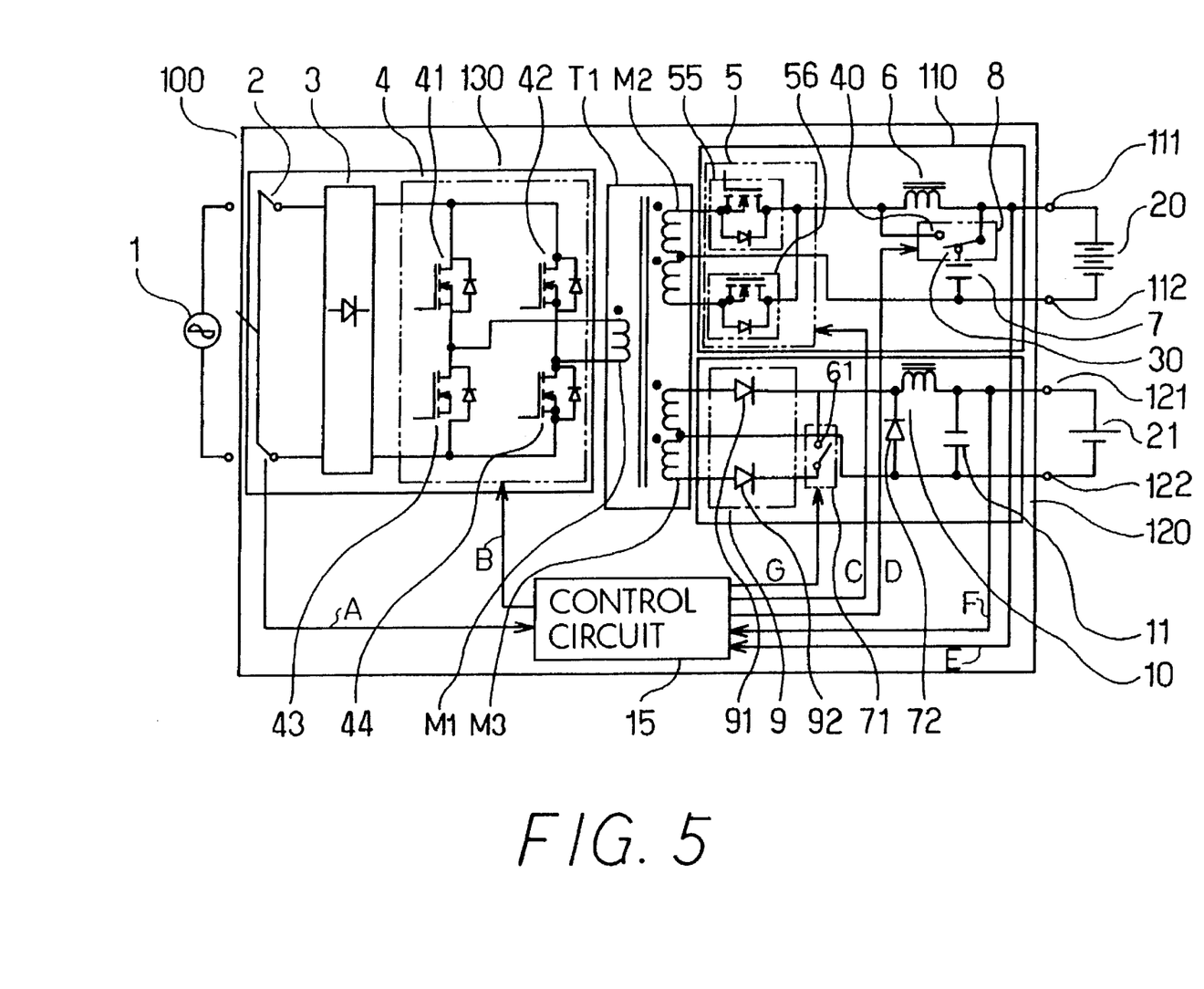
FIG. 5 is an electric wiring diagram illustrating a fourth embodiment of the present invention.

As illustrated in FIG. 5, in comparison with the first embodiment, a switch 71 and a diode 72 are provided on the output side of the rectification circuit a of the second output part 120, and a signal line G is provided for transmitting signals from the control circuit 15 to the switch 71.

The ratio of the number of windings T2 of the secondary winding M2 of for the first output part 110 of the transformer T1 to the number of windings T3 of the secondary winding M3 for the secondary output part 120 is set to be $T2:T3 \approx m:2$ when the number of batteries composing the auxiliary battery 21 is 1 and the number of batteries composing the main battery 20 is m.

The operation of this embodiment will now be described referring to FIG. 6.

Figure 6:
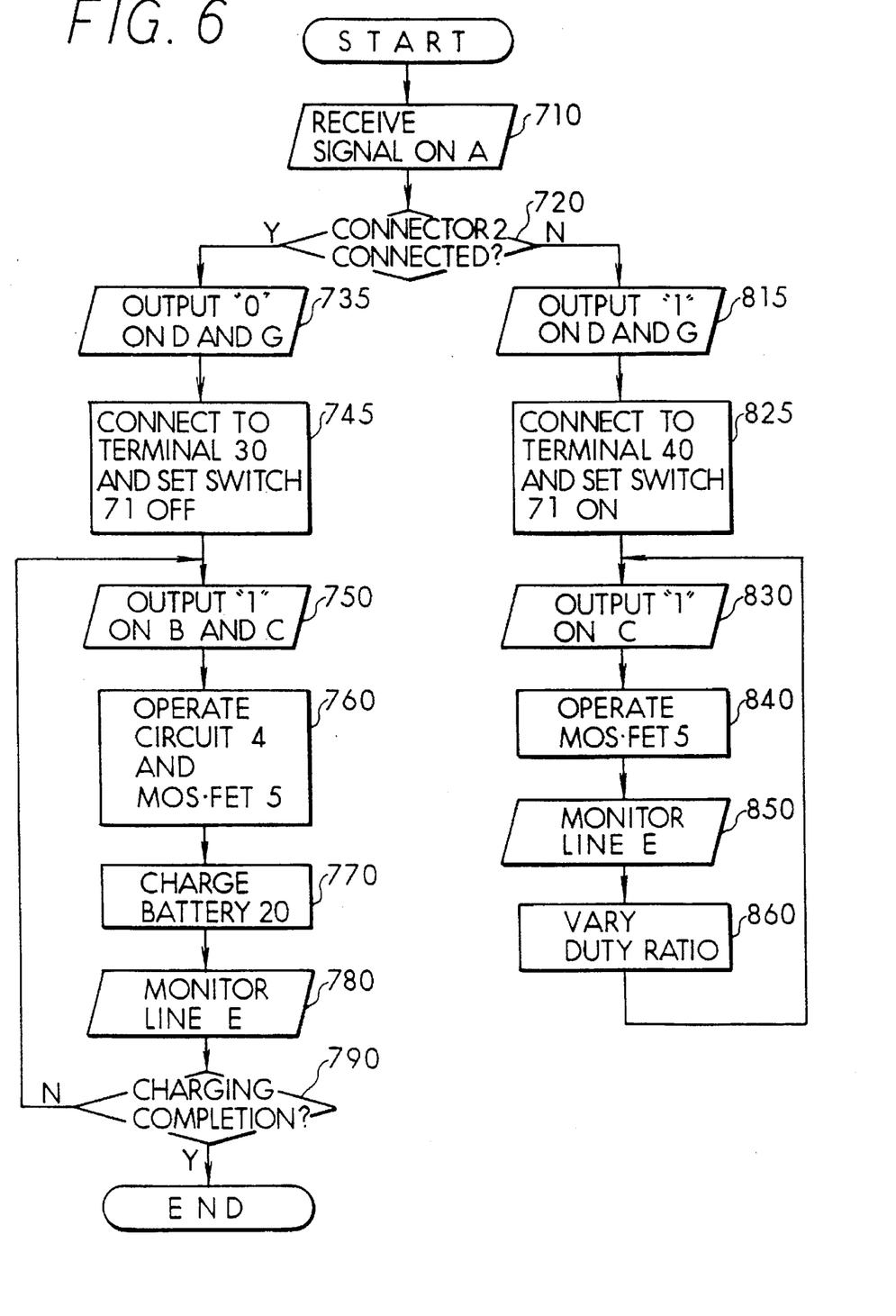
FIG. 6 is a process flow chart illustrating the operation of the battery charging system according to the fourth embodiment of the present invention.

As illustrated in a process flow chart illustrated in FIG. 6, when the operation of this embodiment is compared with the operation of the first embodiment illustrated in FIG. 4, differences are found only in that steps 730 and 740 are changed to steps 735 and 745 respectively and steps 810 and 820 are changed to steps 815 and 825 respectively.

Therefore, only these differences from the first embodiment will be described.

When it is detected in step 720 that the connector 2 is connected to the commercial AC power source 1 and the process proceeds to step 735 (when charging is performed by means of the commercial AC power source 1), the level "0" is output through the signal lines D and G. In the step 745, the change-over switch 8 is connected to the side of the terminal 30 so that the capacitor 7 is connected in parallel with the main battery 20 and the change-over switch 71 is set to the OFF position.

Accordingly, in the second output part 120, the current is half-wave rectified by a rectification diode 91, smoothed by the reactor 10 and the capacitor 11, and charged into an auxiliary battery 21.

On other hand, when it is detected in the step 720 that the connector 2 is not connected to the commercial AC power source 1 and the process proceeds to step 815 (when the commercial AC power source 1 is disconnected), the level "1" is output through the signal lines D and G. Then, in step 825, the change-over switch 8 is connected to the side of terminal 40, the reactor 6 is short-circuited and the capacitor 7 is switched to the opened state on one hand, and switch 71 is connected to the side of a terminal 61 according to a signal from the signal line G and the rectification diode 9 is switched to the state of full-wave rectification by the diode 91 and a diode 92 on the other hand.

The other parts of operation are the same as those of the above first embodiment.

By providing the diode 72, when the rectification device 91 is in the OFF position, the voltage induced by the reactor 10 can be circulated, that is, the rectification device 91 can be operated as a flywheel diode.

Also it is so constructed that when the auxiliary battery 21 is charged with an input from voltage of the main battery 20, the second output part 120 is operated through full-wave rectification.

Therefore, when voltage from the main battery 20 is $V_m$ (Volt) and the ON-OFF duty ratio of the device of the first output part 110 is D, the charging voltage $V_a$ (Volt) of the auxiliary battery 21 can be expressed by the following equations 1 and 2.

[Equation 1]

$$Duty = (On\ time)/(ON\ time + OFF\ time)$$

[Equation 2]

$$Va = Vm \times (2/m) \times Duty$$

With the exception of when energy to the main battery is regenerated, etc., the main battery 20 is in the discharging state and the auxiliary battery 21 is in the charging state, and therefore the voltage per battery composing the main battery 20 is lower than the voltage per battery composing the auxiliary battery 21. However, as the number of output windings for the auxiliary battery 21 is doubled and the second output part is operated through full-wave rectification, the auxiliary battery 21 can be controlled to the chargeable voltage.

[Fifth Embodiment]

Figure 7:
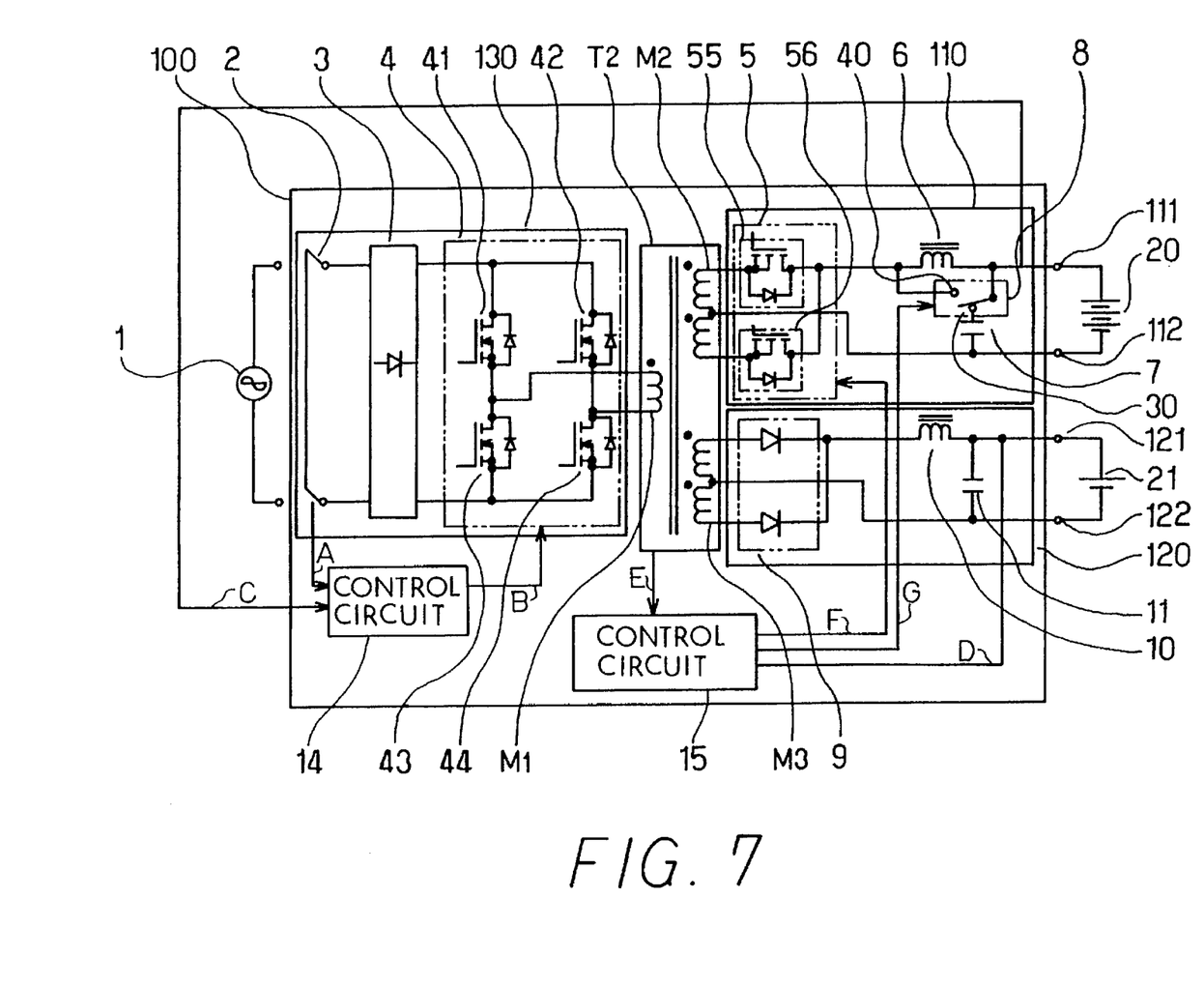
FIG. 7 is an electric wiring diagram illustrating a fifth embodiment according to the present invention.

As illustrated in FIG. 7, the charger 100 is connected to the commercial AC power source 1 to charge the main battery 20 and auxiliary battery 20 for driving an electric vehicle. Even when the electric vehicle is running, the charger 100 charges the auxiliary battery 21 with an input of voltage from the main battery 20.

The charger 100 illustrated in FIG. 7 is comprised of mainly the primary side circuit 130, the separable inductive coupler T2, the first output part 110 on the secondary side, the second output part 120 on the secondary side, the control circuit 15 for controlling the primary side circuit 130, and the control circuit 15 for controlling the secondary circuits 120 and 130.

As the main composition of the charger 100 is the same as that of the first embodiment, the same reference numerals will be allocated to the counterparts and the description thereof will be omitted.

Here, the primary side circuit 130, the primary side winding M1 of the inductive coupler T2 and the control circuit 14 are provided within a charging stand, and the secondary side windings M2 and M3 of the inductive coupler T2, the first output part 110, the second output part 120, the control circuit 15, etc. are provided within the electric vehicle.

The control circuit 14 is connected to the connector 2, the switching circuit 4 and the output terminal 111 through the signal lines A, B and C, respectively, to control the switching circuit 4 according to signals from the signal lines A and C, respectively.

On the other hand, the control circuit 15 is connected to the coupling part of the inductive coupler T2, the integrated rectifier-converter circuit 5, the change-over switch 8 and the output terminal 121 through the signal lines D, E, F and G, respectively, to control the integrated rectifier-converter circuit 5 and the change-over switch 8 according to signals from the signal lines D and E, respectively.

Figure 8:
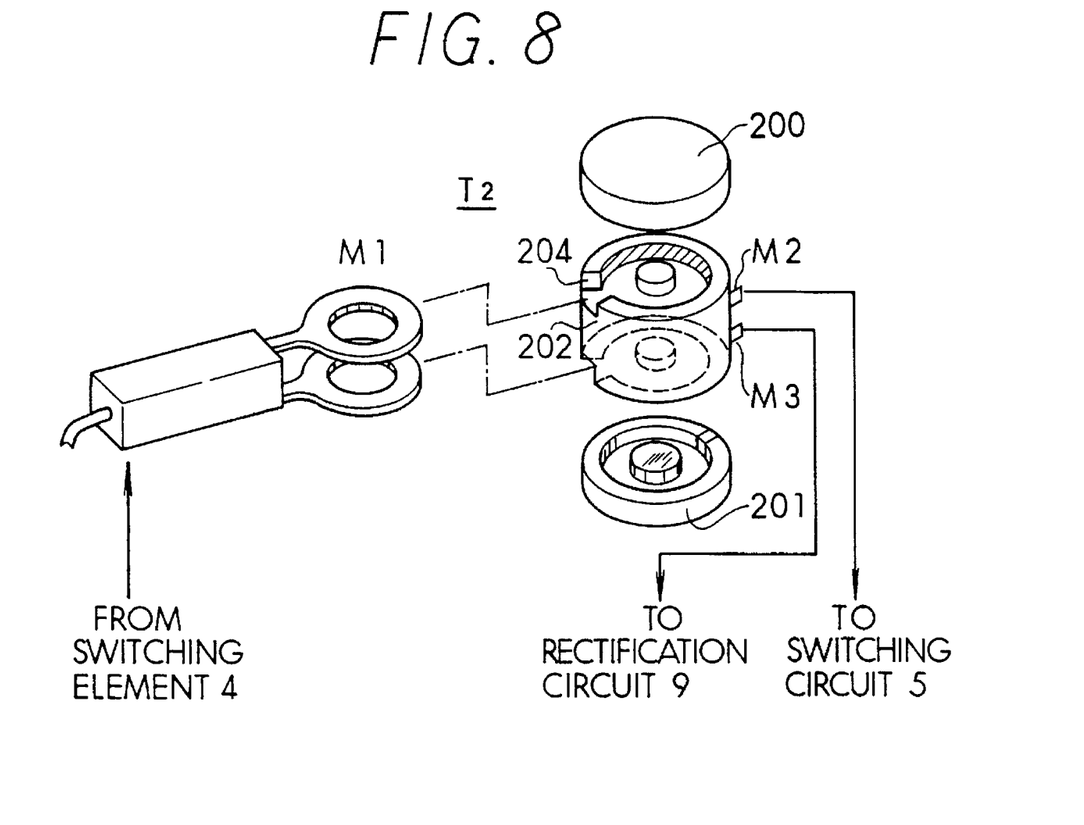
FIG. 8 is a perspective view illustrating an inductive coupler.
Figure 9:
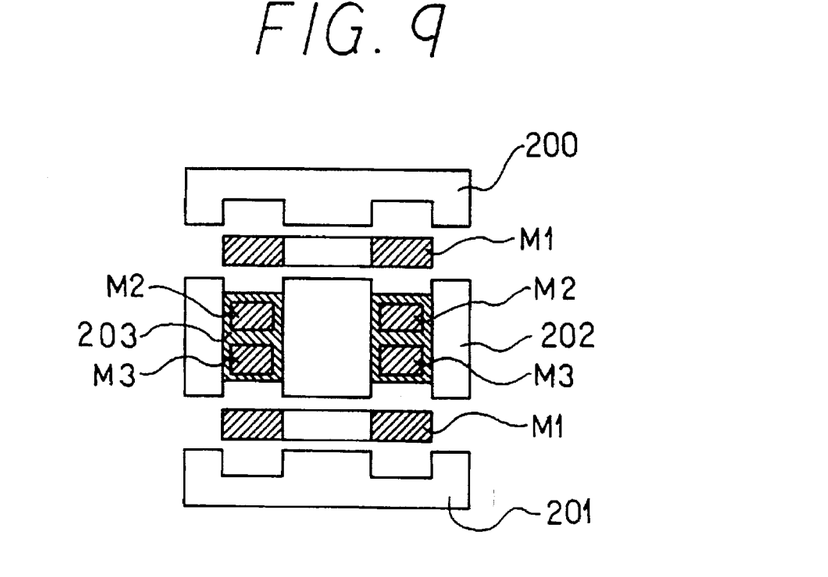
FIG. 9 is a cross-sectional view illustrating the inductive coupler.

As illustrated in FIGS. 8 and 9, in the inductive coupler T2, the primary winding M1 having 2 turns of windings is comprised of a first core member 200, a second core member 201, a first secondary winding M2 including a guide 204 for fixing the second core member 201 and the primary winding M1, and a third core member 202 including a second secondary winding M3.

Next, the operation of the charging system so constructed as above will be described referring to FIGS. 11 and 12.

[When Charging by Commercial AC Power Source (When Inductive Coupler T2 Is Connected)]

Figure 11:
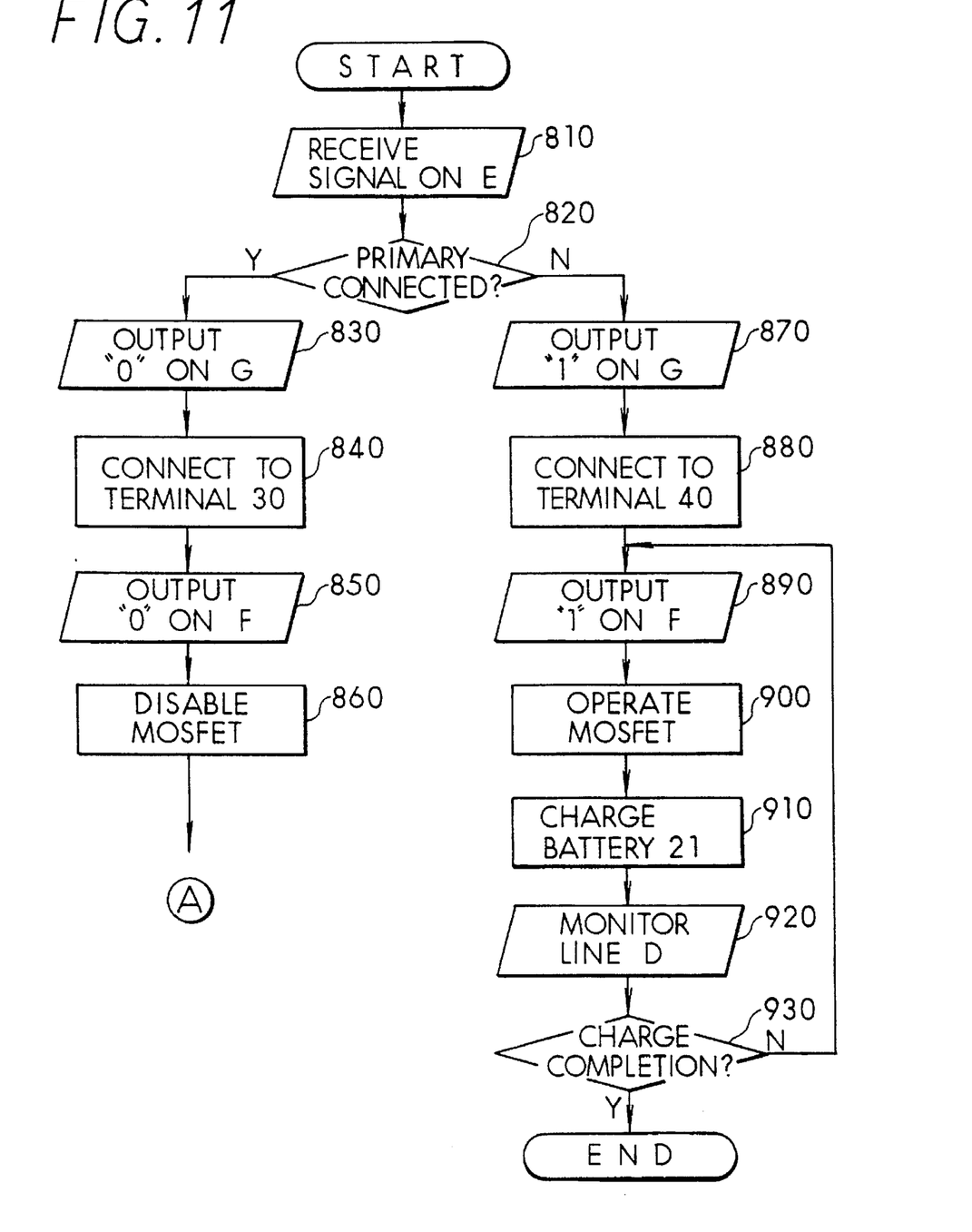
FIG. 11 is a part of a process flow chart illustrating the operation of the battery charging system according to the fifth embodiment of the present invention.
Figure 12:
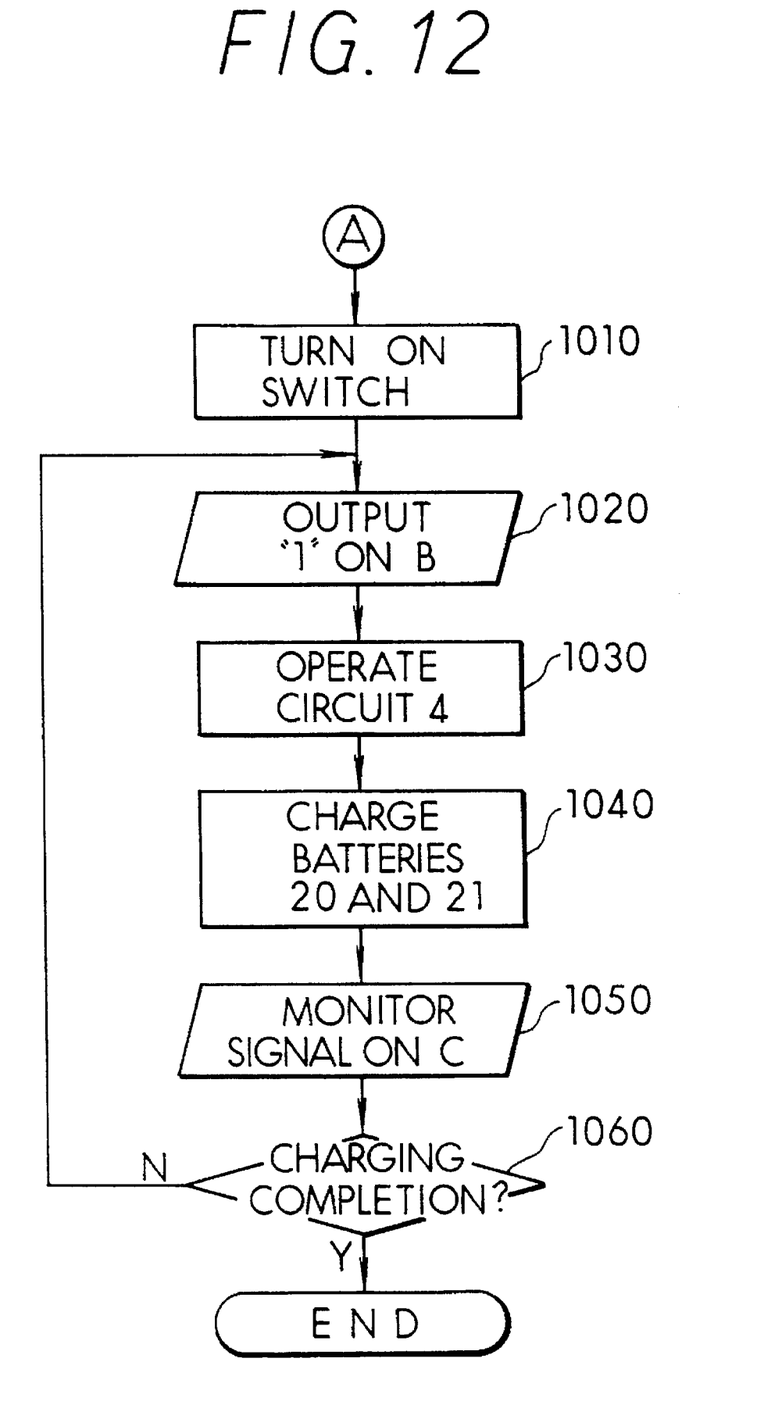
FIG. 12 is an another process flow chart illustrating the operation of the battery charging system according to the fifth embodiment of the present invention.

In a process flow chart illustrated in FIG. 11, the control circuit 15 receives a signal from the signal line E in step 810, and determines that the primary winding M1 of the inductive coupler T2 is connected to the secondary windings M2 and M3 in step 820, and the process proceeds to step 830. On other hand, the switch 2 is turned ON in the step 1010, the control circuit 14 charges the main battery 20 and the auxiliary battery 21 by using the commercial AC power source 1 in step 1020. Now, a description will be given of the above described operation.

The inductive coupler T2 forms a transformer of sandwich structure with the primary winding M1 and the secondary windings M2 and M3 having a very strong coupling power by sandwiching the third core member 202 with the first and second core members 200 and 201 from above and from below respectively.

The control circuit 15 detects through the signal line E that the primary winding M1 is coupled with the secondary windings M2 and M3, outputs the level "0" in step 830 through the signal line G, and connects the change-over switch 8 to the side of the terminal 30 in step 840 to connect the capacitor 7 in parallel with the main battery 20. On the other hand, the control circuit 15 disables the power MOSFETs by outputting the level "0" through the signal line F and actuates the change-over circuit 15 as a rectification circuit.

The AC current supplied from the commercial AC power source 1 is full-wave rectified by the rectification circuit 3 into direct current. When an operator of a vehicle is going to charge his or her vehicle connects the connector 2 by turning ON the relevant switch, the control circuit 14 outputs the level "1" through signal line B in the step 720 in the process flow chart of FIG. 12. The switching circuit 4 performs switching by the full-wave bridging method by means of signals from the control circuit 14 in step 1030, and flows the current rectified by the rectification circuit 3 to the primary winding M1 of the inductive coupler T2 to induce the primary winding M2 of the inductive coupler T2.

On the other hand, the current on the secondary side generated by the induced voltage is full-wave rectified by the parasitic diodes of the MOSFETs 51 and 52 of the integrated rectifier converter circuit 5, smoothed by the reactor 6 and the capacitor 7, and charged into the main battery 20 in step 1040.

The secondary winding M3 of the inductive coupler T2 is also induced by the switching of the switching circuit 4. The current generated by the induced voltage is full-wave rectified by the rectification diode 9 of the second output part 120, smoothed by the reactor 10 and the capacitor 11, and charged into the auxiliary battery 21.

In step 1050, the control circuit 14 monitors the charging voltage to the main battery 20 through the signal line C and varies the duty ratio of switching by the switching circuit 4 to maintain the charging voltage to a constant level. In a step 1060 in FIG. 12, the control circuits 14 and 15 determine that the charging is completed when voltage from the main battery 20 reaches the preset voltage, and terminates the charging operation.

[When Commercial AC Power Source (Inductive Coupler T2) Is Disconnected)]

When the electric vehicle has been charged, the first core member 200 and the second core member 201 are in the open position with respect to the third core member 202 including the second secondary winding, and the primary winding M1 of the inductive coupler T2 is separated from these members. When the first core member 200 and the second core member 201 are in the closed position sandwiching the third core member 202 with the minimum clearance therebetween, and the secondary winding M2 of the first output part 110 and the secondary winding M3 of the second output part 120 are coupled with each other to form a transformer.

As the primary side of the inductive coupler T2 is not coupled at this time, "NO" is determined in step 820 in FIG. 11, and the process proceeds to step 870. The control circuit 15 outputs the level "1" through the signal line G in step 870, connects the change-over switch 8 to the side of the terminal 40 to short-circuit the reactor 6 and also to switch capacitor 7 to the opened state in the step 880.

With the power supply from the main battery 20 in this state, when the control circuit 15 outputs the level "1" through the signal line F, the integrated rectifier-converter circuit 5 performs push-pull switching operation and the secondary winding M2 of the inductive coupler T2 becomes the primary winding M2', and thereby the secondary winding M3 of the inductive coupler T2 is induced.

The current generated by the induced voltage is full-wave rectified, smoothed by the reactor 10 and the capacitor 11, and charged into the auxiliary battery 21.

The control circuit 15 monitors the charging voltage to the auxiliary battery 21 through the signal line D in the step 920 in FIG. 7, and varies the duty ratio of the switching by the switching circuit 4 in step 900 to maintain the charging voltage to a constant level.

Therefore, in both cases where the separable inductive coupler T2 is provided and the main battery 20 and the auxiliary battery 21 are charged from the commercial AC power source 1 connected thereto, i.e., where the electric vehicle is being charged, and where the auxiliary battery 21 is charged with an input of voltage from the main battery 20 with the commercial AC power source 1 disconnected therefrom, i.e., where the electric vehicle is running, the charging operation is possible. Accordingly, an efficient operation means for the inductive coupler can be provided which can raise the low usage rate of the inductive coupler T2 which is used only when the electric vehicle is being charged as seen in the prior art.

The above embodiment may be so modified that the reactor 6, the capacitor 7 and the change-over switch 8 are dispensed with and the terminal 111 is directly connected to the integrated rectifier converter circuit 5.

[Sixth Embodiment]

In the above fifth embodiment, the integrated rectifier-converter circuit 5 is comprised of MOSFETs. The same effect, however, can be obtained by combining the transistors 511 and 513 and the rectification diodes 512 and 514 as illustrated in FIG. 2 or IGBT and rectification diode.

[Seventh Embodiment]

The above fifth embodiment may be so modified that the change-over switch 8 is reformed as illustrated in FIG. 3 in the same way as the above third embodiment.

As illustrated in FIG. 3, the change-over switch 81 is provided for the smoothing circuit comprised of the reactor 6 and he capacitor 7, which is different from the first embodiment. This change-over switch 81 includes the terminal 83 for connecting the left side (FIG. 3) of the reactor 6 and the capacitor 7 and the terminal 82 for connecting the right side (FIG. 3) of the reactor 6 and the capacitor 7.

Hereinafter, the operation of the change-over switch 8 will be described.

When the primary winding M1 of the inductive coupler T2 is coupled with the secondary windings M2 and M3 to charge the main battery 20 and the auxiliary battery 21, the change-over switch 81 is connected to the side of the terminal 82 and operates as a smoothing circuit in the same way as in the first embodiment.

On the other hand, when the primary winding M1 of the inductive coupler T2 is separated from the secondary windings M2 and M3, the secondary windings M2 and M3 are coupled with each other, and the auxiliary battery 21 is charged with an input of voltage from the main battery 20, the change-over switch 81 is connected to the side of the terminal 83.

When voltage from the main battery 20 is accumulated in the capacitor 7, the voltage accumulated in the capacitor 7 is switched by the push-pull type change-over circuit 6 driven by the control circuit 15, the secondary winding M2 of the inductive coupler T2 becomes the primary winding M2', the secondary winding M3 of the transformer T2 is induced, and charging is performed in the same way as in the fifth embodiment.

[Eighth Embodiment]

Figure 10:
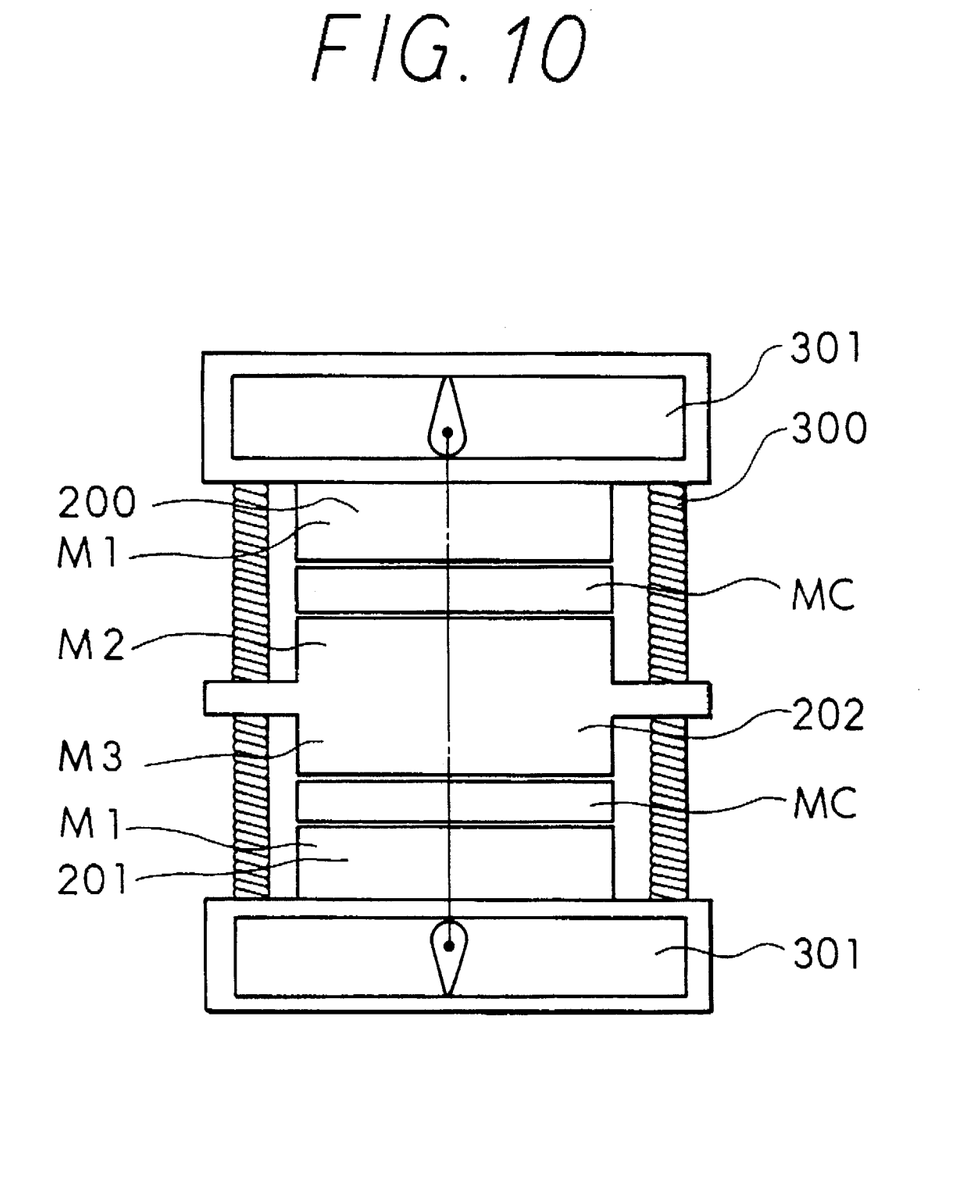
FIG. 10 is a schematic view illustrating the inductive coupler, a primary coil and a magnetic body.

In the above fifth embodiment, as illustrated in FIG. 10, when the primary winding M1 is coupled with the secondary windings M2 and M3 or when the primary winding M1 is separated from the secondary windings M2 and M3 and then coupled with the secondary windings M2 and M3, in order to maintain the coupled state of the first and second core parts including the secondary windings M2 and M3 of the inductive coupler T2 and the magnetic core parts, the clearance is minimized by a spring means 300 attached to the movable parts and compose a transformer, and thereby charging is performed in the same way as in the fifth embodiment.

[Ninth Embodiment]

In the above fifth embodiment, when the primary winding M1 of the inductive coupler T2 is separated from the secondary windings M2 and M3, gaps exist between the first core member 200 and the third core member 202 and between the second core member 201 and the third core member 202, respectively. To minimize these gaps, ferrite or any other magnetic body MC is inserted thereinto. Therefore, the secondary winding M2 of the first output part 110 is coupled with the secondary winding M3 of the second output part 120 to form a transformer with high coupling power.

What is claimed is:

1. A battery charging system comprising:

a main battery for driving a vehicle;

an auxiliary battery for driving an auxiliary device of the vehicle, the battery charging system charging the main battery and the auxiliary battery when a supply of electric power is received from a commercial AC power source;

a rectification circuit for rectifying electric power from the commercial AC power source;

a converter for converting the rectified electric power to AC input power;

a transformer to transform the AC input power, the transformer including an output winding having a first part to output first AC power and a second part to output second AC power;

a first output part, connected to the first part of the output winding of the transformer, to rectify the first AC power and to supply the first AC power to the main battery; and a second output part, connected to the second part of the output winding of the transformer, to rectify the second AC power and to supply the second AC power to the auxiliary battery; and a converting Circuit, included in the first output part, to convert, when the battery charging system does not receive the electric power from the commercial AC power source, electric power of the main battery to the second AC power to provide electric power from the main battery to the auxiliary battery through the first part and the second part of the output winding.

2. A battery charging system for an electric vehicle, the battery charging system comprising:

a rectification circuit for rectifying electric power from a commercial AC power source;

a DC/AC converter for converting the rectified electric power into AC input power;

a transformer for stepping up/down an output from the DC/AC converter, the transformer including a first output winding and a second output winding;

a first output part, connected to the first output winding, comprised of a rectifying device which rectifies a first output voltage of the first output winding by allowing current to flow bidirectionally therethrough, the first output part outputting the rectified first output voltage of the first output winding to a main battery of the electric vehicle when electric power is supplied from the commercial AC power source, and, when the battery charging system does not receive the electric power from the commercial AC power source, the first output part converting DC voltage of the main battery to regenerated AC voltage and applying the regenerated AC voltage to the first output winding to induce a second output voltage in the second output winding; and a second output part, connected to the second output winding, to rectify the second output voltage and output the second output voltage to the auxiliary battery for driving an auxiliary electric load.

3. The battery charging system for an electric vehicle according to claim 2, wherein the bidirectional device of the first output part comprises:

a plurality of MOSFETs.

4. The battery charging system for an electric vehicle according to claim 2, wherein the bidirectional device of the first output part comprises:

a rectifying device; and a switching device connected in parallel with the rectifying device;

the bidirectional device performing high-frequency AC conversion by switching the switching device when the auxiliary battery is charged with an input of electric power from the main battery.

5. The battery charging system for an electric vehicle according to claim 4, wherein:

the switching device is switched in synchronization with switching of the DC/AC converter; and the switching device rectifies the output voltage of the first output part of the output winding of the transformer jointly with the rectifying device.

6. The battery charging system for an electric vehicle according to claim 2, further comprising:

a smoothing circuit disposed between the first output part and the main battery, the smoothing circuit comprising:

a smoothing coil, and a smoothing capacitor for smoothing the rectified first output voltage, the smoothing circuit outputting the smoothed rectified first output voltage to the main battery.

7. The battery charging system for an electric vehicle according to claim 6, further comprising:

first switching means connected in parallel with the smoothing coil to short-circuit the smoothing coil when the auxiliary battery is charged with electric power from the main battery.

8. The battery charging system for an electric vehicle according to claim 6, further comprising:

second switching means for switching the smoothing capacitor to a first output side of the second switching means when the auxiliary battery is charged with an input of electric power from the main battery.

9. The battery charging system for an electric vehicle according to claim 2, wherein the second output part comprises:

a first rectification device;

a second rectification device; and a switch for opening/closing a connection between output terminals of the first rectification device and the second rectification device.

10. The battery charging system for an electric vehicle according to claim 9, wherein:

a ratio of a number of windings T2 for the first output part of the transformer to a number of windings T3 for the second output part is set to be T2:T3=m:2, where a number of batteries composing the auxiliary battery is 1 and a number of batteries composing the main battery is m.

11. A battery charging system for an electric vehicle comprising:

an inductive coupler provided with a primary coil and a secondary coil separable from each other for stepping up/down voltage supplied to the primary coil and outputting the same to a secondary coil side;

a first output part comprised of a bidirectional device which can bidirectionally flow current for rectifying an output voltage of a first part of the secondary coil of the inductive coupler and outputting the same to the main battery for driving the vehicle when electric power is supplied to the primary coil of the inductive coupler, and performing high-frequency AC conversion when the auxiliary battery is charged with an input of electric power from the main battery; and a second output part for rectifying an output voltage of a second part of the secondary coil of the inductive coupler and outputting the same to an auxiliary battery for driving an auxiliary electric load.

12. The battery charging system for an electric vehicle according to claim 11, wherein:

the inductive coupler is comprised of a housing in which the primary coil is insulated with an insulating material, a primary coil winding disposed within the housing and an electric cable connected to the primary coil winding for coupling electric power from an external electric power source;

the secondary coil is comprised of a first magnetic core part and a second magnetic core part which can be coupled with each other and a third magnetic core provided between the first magnetic core and the second magnetic core, and comprises recessed parts which enable the primary coil to be inserted thereinto between the first magnetic core part and the third magnetic core part and between the second magnetic core part and the third magnetic core part respectively;

the primary coil and the secondary coil are so constructed as to form a transformer when the primary coil and the secondary coil are coupled with each other; and the first secondary coil is operated as a primary coil to form a transformer when the primary coil and the secondary coil are separated from each other.

13. The battery charging system for an electric vehicle according to claim 12, wherein:

the inductive coupler comprises an opening/closing means for opening/closing the first, second and third magnetic core parts.

14. The battery charging system for an electric vehicle according to claim 13, wherein the opening/closing means comprises:

a means for positioning the first, second and third magnetic core parts in the opened or closed position by moving a movable member to which the upper first magnetic core part is attached and a movable member to which the second magnetic core part is attached to enable the movable parts to sandwich the third magnetic core part from upper and below; and a spring means coupled with the movable member for holding the first, second and third magnetic core parts in the coupled state when the first, second and third magnetic core parts are coupled in the closed position.

15. The battery charging system for an electric vehicle according to claim 13, further comprising:

a magnetic body to be inserted into the recessed part when the primary coil and the secondary coil are separated from each other.

16. The battery charging system for an electric vehicle according to claim 15, wherein:

the magnetic body is made of ferrite for high frequency.

17. The battery charging system for an electric vehicle according to claim 4, wherein at least one of the rectifying device and the switching device comprise:

a plurality of MOSFETs.

18. The battery charging system for an electric vehicle according to claim 4, wherein at least one of the rectifying device and the switching device comprise:

a plurality of transistors; and a plurality of diodes.

19. The battery charging system for an electric vehicle according to claim 2, wherein the second output part comprises:

a first rectification device; and a second rectification device.

20. The battery charging system for an electric vehicle according to claim 19, the battery charging system further comprising:

a smoothing circuit disposed between the second output part and the auxiliary battery, the smoothing circuit comprising:

a smoothing coil, and a smoothing capacitor for smoothing the rectified second output voltage, the smoothing circuit outputting the smoothed rectified second output voltage to the auxiliary battery.

21. The battery charging system for an electric vehicle according to claim 4, wherein the second output part comprises:

a first rectification device; and a second rectification device.

22. The battery charging system for an electric vehicle according to claim 4, the battery charging system further comprising:

a smoothing circuit disposed between the second output part and the auxiliary battery, the smoothing circuit comprising:

a smoothing coil, and a smoothing capacitor for smoothing the rectified second output voltage, the smoothing circuit outputting the smoothed rectified second output voltage to the auxiliary battery.

23. A battery charging system comprising:

a transformer having a primary winding on a primary side and a first secondary winding and a second secondary winding on a secondary side;

a first rectification circuit, connected to a connection for a commercial AC power source, to convert commercial AC power to a DC voltage;

a DC/AC converter, connected to the primary winding of the transformer, to convert the DC voltage to AC input power;

a rectification/converting device, connected to the first secondary winding of the transformer, to rectify AC voltage across the first secondary winding, when electric power is supplied from the commercial AC power source, to charge a main battery, and to convert DC voltage from the main battery to regenerated AC power, when the battery charging system does not receive the electric power from the commercial AC power source, and applying the regenerated AC voltage to the first secondary winding of the transformer to induce a second AC voltage in the second secondary winding; and a second rectification device, connected to the second secondary winding, to rectify the second AC voltage across the second secondary winding and to output the rectified second AC voltage to the auxiliary battery.

* * * * *